United States Patent [19]

Saurenman

[11] 4,395,900

[45] Aug. 2, 1983

[54] STIFF METAL RING AND PROCESS FOR MAKING IT

[76] Inventor: Phillip E. Saurenman, 3438 Vosburg St., Pasadena, Calif. 91107

[21] Appl. No.: 318,015

[22] Filed: Nov. 4, 1981

Related U.S. Application Data

[63] Continuation of Ser. No. 16,970, Mar. 2, 1979, abandoned.

[51] Int. Cl.³ .............................................. B21D 39/02
[52] U.S. Cl. ....................................... 72/368; 29/428; 29/521; 72/398
[58] Field of Search .................... 72/48, 51, 368, 378, 72/471; 29/149.5 R, 149.5 C, 428, 521; 228/735, 136, 137

[56] References Cited

U.S. PATENT DOCUMENTS

| | | | |
|---|---|---|---|
| 387,651 | 8/1888 | Maxim | 228/135 |
| 2,158,176 | 5/1939 | Dewey | 72/398 |
| 2,283,918 | 5/1942 | Dekome | |
| 2,317,198 | 4/1943 | Kasper | 72/51 |
| 2,675,774 | 4/1954 | Bergan | 72/368 |
| 2,762,117 | 9/1956 | Houck | |
| 2,762,118 | 9/1956 | Shaw et al. | 29/149.5 R |
| 3,273,601 | 9/1966 | DeGain | |
| 3,418,706 | 12/1968 | White | |

FOREIGN PATENT DOCUMENTS 1777410 4/1974 Fed. Rep. of Germany ........ 72/368

*Primary Examiner*—Lowell A. Larson
*Attorney, Agent, or Firm*—Donald D. Mon

[57] ABSTRACT

A stiff ring useful for such purposes as electric motor housings. The ring is a single piece, usually having a ratio of diameter to wall thickness less than about 40:1. The ring consists of a single piece of steel cut from a continuous strip having a tongue at one end and a recess at the other. These have interfering tapered locking segments to prevent separation, and are interlinked with one another. The process for making the ring comprises forming the strip in a U-shape around a cylindrical mandrel by interaction with a first half cylindrical die part, and then while holding the bent strip with the mandrel and first die part pressing the free ends so that they symmetrically pass along the inside surface of a second semi-cylindrical die part with the interlocking ends of the strip shaped and riding the die in such a manner that the tongue and recess inter-engage one another with a minimum of physical interference. Then the interlocking joint is coined by bringing the die parts against the ring while it is still supported on the mandrel. The tongue has extensions ahead of its locking section to permit single stroke non-destructive engagement of the interlocking ends. The tongue and recess ends can be angulated to further aid this engagement.

13 Claims, 16 Drawing Figures

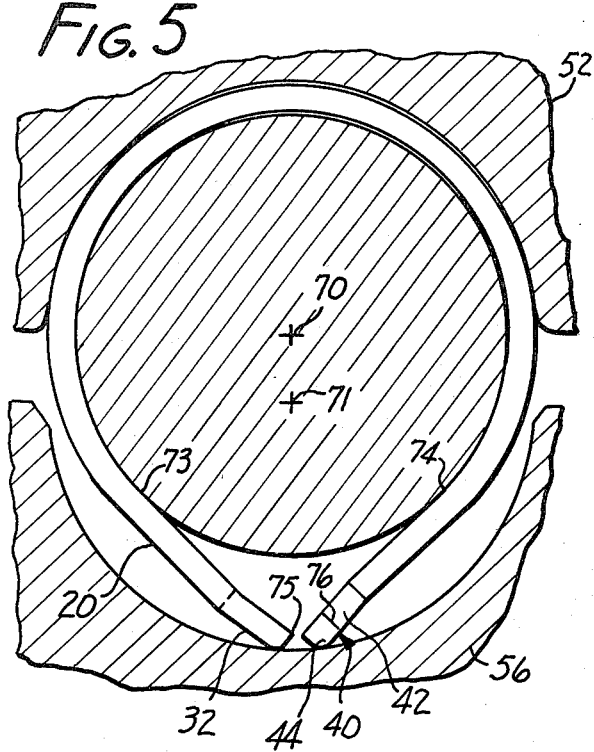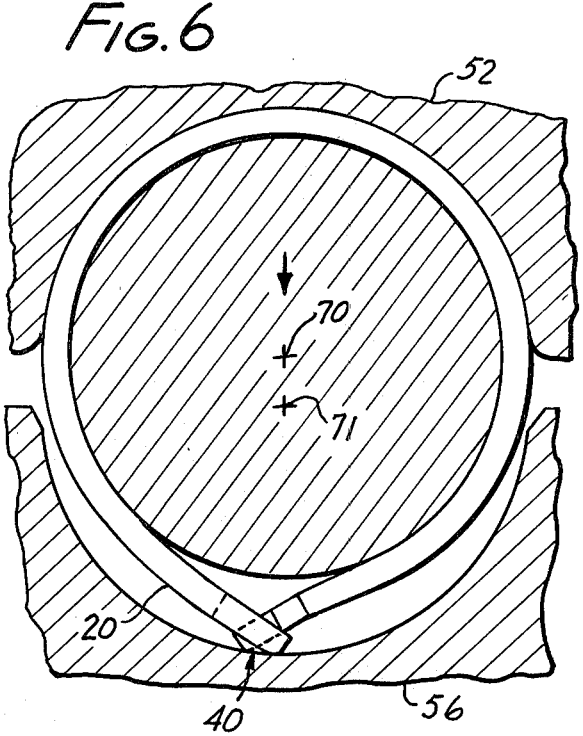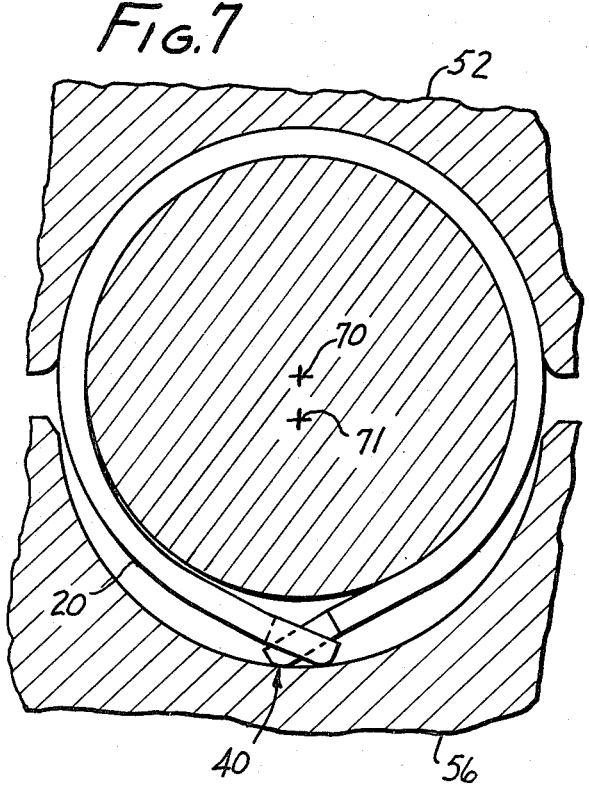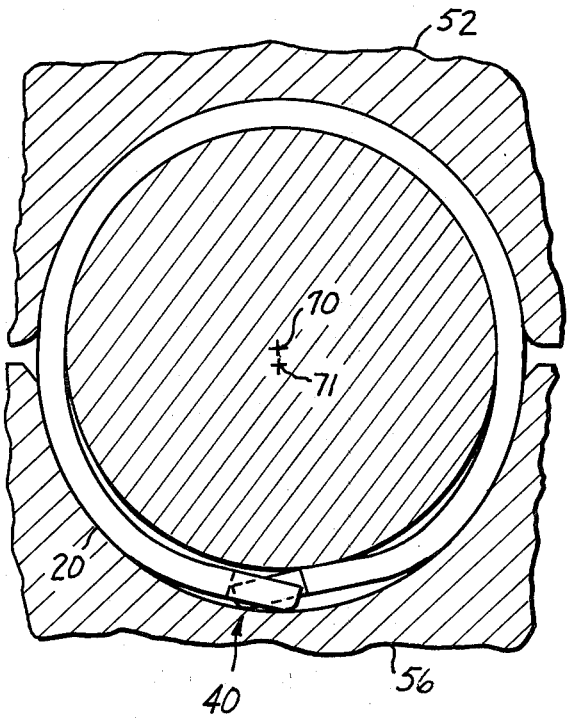

STIFF METAL RING AND PROCESS FOR MAKING IT

CROSS REFERENCE TO OTHER APPLICATION

This is a continuation of applicant's co-pending U.S. patent application Ser. No. 16,970, filed Mar. 2, 1979, entitled "Stiff Metal Ring and Process for Making It", which will be abandoned upon the timely filing of this application.

This invention relates to stiff metal rings and to means for making them.

Stiff metal rings made of steel find many uses. One of their classical uses is as a housing for an electric motor. There are many techniques for making these rings, and there are many structures of rings which take a strip and wrap it into a circular pattern and somehow hold it in the shape. Fingers on the ends which interdigitate are known, as are tabs which are folded onto one another. Generally speaking, known techniques require the use of relatively complicated mechanisms and result in higher than necessary costs, especially when the wall thickness of the ring is fairly heavy, such as on the order of 3/32 inch or greater.

It is an object of this invention to provide a ring and a process for making it, which can readily be constructed, which is physically interlocked, which has high cylindrical accuracy and is inexpensive to manufacture, and which can have a fairly low outer diameter to wall thickness ratio such as 40:1 or less.

A stiff ring according to this invention consists of a cylindrically formed single piece of steel which has been cut from a continuous strip. The strip has dimensions of width, thickness and axial length, and axially parallel side edges. It also has a pair of ends which extend between the side edges, one of said ends having a projecting tongue and the other of said ends having a mating recess. The tongue and the recess have locking segments which diverge in such a way as to physically interlock the ends of the strip when the ring is assembled.

According to one feature of the invention, one of the ends has pilot segments which permit non-destructive entry of the tongue into the recess.

A process for manufacturing this ring comprises starting with strip material, cut off with a die having the geometry of the two ends, and (optionally) being bent so as to angulate the end, then forming the strip into a U-shape around a mandrel and while backing the bight of the U with a half cylindrical die part, pressing the two ends of the strip along the semi-cylindrical contour of a second die part in such a manner that the tongue enters the groove and the die parts can then be brought together against the ring, pressing it against the mandrel to coin the ring to a cylindrical shape with the tongue and recess strongly interlocked.

The above and other features of this invention will be fully understood from the following detailed description and the accompanying drawings, in which:

FIGS. 5-10 are progressive end views showing the completion of the ring after the positions of FIG. 3.

FIG. 1 shows a plan view of a piece 20 of steel such as mild steel which has been cut from a roll, preferably flattened, and then cut at both of its ends. It preferably is also bent near both of its ends in a matter yet to be described.

Figure 1:
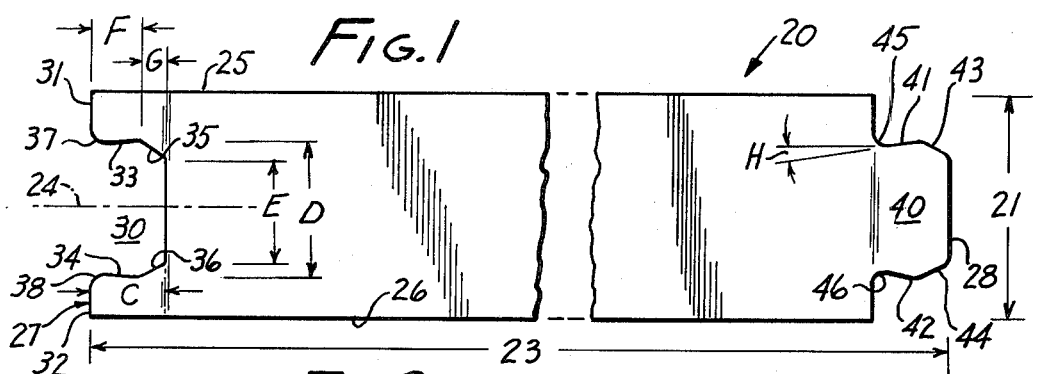
FIG. 1 is a plan view of a strip used to make a ring according to the invention.

Piece 20 has dimensions of width 21, thickness 22, and axial length 23, said length extending along axis 24. The piece also has a pair of side edges 25, 26 which extend axially and parallel to one another, a first end 27, and a second end 28. It will be seen that the ends are complementary, so that when the piece was cut from the coil no material was wasted. The ends are made from identical, sequential die cuts.

First end 27 has an axially recessing recess 30 therein. This leaves a pair of fingers 31, 32 on each side thereof. The recess is intended to be a re-entrant structure, and it has a pair of locking segments 33, 34 which diverge from one another as they extend toward the second end. Clearance segments 35, 36 are provided for a purpose yet to be described. Conveniently, radii 37, 38 are provided at the outer edges of the recess.

At the second end, a tongue 40 is provided. It is laterally spaced from the side edges. It includes a pair of locking segments 41, 42 which diverge from one another as they extend away from the first end. The tongue also includes a pair of pilot segments 43, 44 which converge toward one another as they extend away from the first end. Radii 45, 46 are provided at the inner ends at the inner end of the tongue to match radii 37 and 38. The tongue and the recess are cut by the same die in successive blows as the strip is led between a single die. This die is quite conventional and requires no detailed description here.

Figure 2:
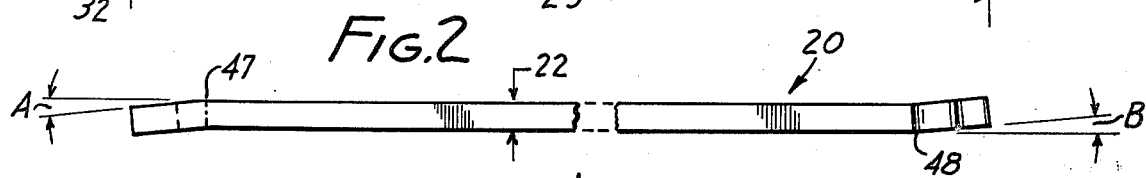
FIG. 2 is a side view of FIG. 1.

The assembly of the interlocking joint can be facilitated by providing a first inward bend 47 and a second outward bend 48 adjacent to the recess and to the tongue end respectively. This can be done in a later step. These bends are best shown in FIG. 2. The bends are optional, but they do aid non-destructive interdigitation of the interlocking joint.

It is an object of this invention to form piece 20 as described into a cylindrical ring with its ends interlocked. It will be seen that a direct coplanar shove of the tongue into the recess would have to overcome considerable dimensional interference and cause considerable distortion and loss of locking engagement. Obviously this is not the best technique, but it is a technique which is widely used in the prior art and for this reason the prior art seldom is able to show relatively heavy-walled rings having interfering tongue and recess construction assembled in a simple, single stroke forming operation. Instead, straight fingers are usually used, or crimped constructions, or compound joint forming operations.

In this invention, a cylindrical mandrel 50 is provided which is slideably mounted to a machine base 51. The machine is a press whose operation is completely conventional, and requires no detailed description here. The first step in the manufacture of this ring is shown in solid line in FIG. 3. In addition to the mandrel, the machine has a first die part 52 with a semi-cylindrical die face 53 facing downwardly toward piece 20. The die is somewhat rounded by radii 54, 55 near its edges, but this does not cause the die to depart substantially from a semi-cylindrical shape. A second die part 56 is disposed beneath the mandrel, and it also includes a semi-cylindrical die face 57 facing upward, which has a pair of guide faces 58, 59 at the edges to facilitate the initial movement of the pieces which will later be described.

Preferably but not necessarily, the second die part is recessed to provide a pair of side shoulders 60, 61 to act as guides for the side edge piece as it progresses down die face 57. This is optional, but it does assist in keeping the ends of the piece properly aligned.

The pressing operation is carried out in several steps. First is the insertion of the piece to the proper location beneath the raised and separated first die part and mandrel. Then with the mandrel held at the level shown, the first die part is brought down over it to bend the strip to a U-shape as shown in dashed line. It then has a bight 65 and a pair of arms 66, 67.

Next, with the first die part held firmly against the piece, and holding the piece against the mandrel as illustrated by dashed line, it and the mandrel are together brought down to press the ends of the piece along the die face of the second die part. This will cause the sequence of operations yet to be described.

The last portion of the process is a coining type movement wherein the die parts are strongly brought together against the piece to complete the ring, and the ring is strongly brought together against the mandrel so as to form the ring into a truly cylindrical part. The dies are retracted and the ring is axially ejected off of the mandrel. The process can be repeated indefinitely with successive pieces of metal.

Conventional presses can be used for this purpose, provided they are adapted for the movements described. In addition to the described movements, it is equally possible to hold the mandrel always stationary, first bringing the first die part against the mandrel and then bringing the second die part upwardly while the first die part is held in position. It is to be understood that the specific details of movement of the die parts and mandrels are not of importance so long as their relative interactions are as described.

Figure 3:
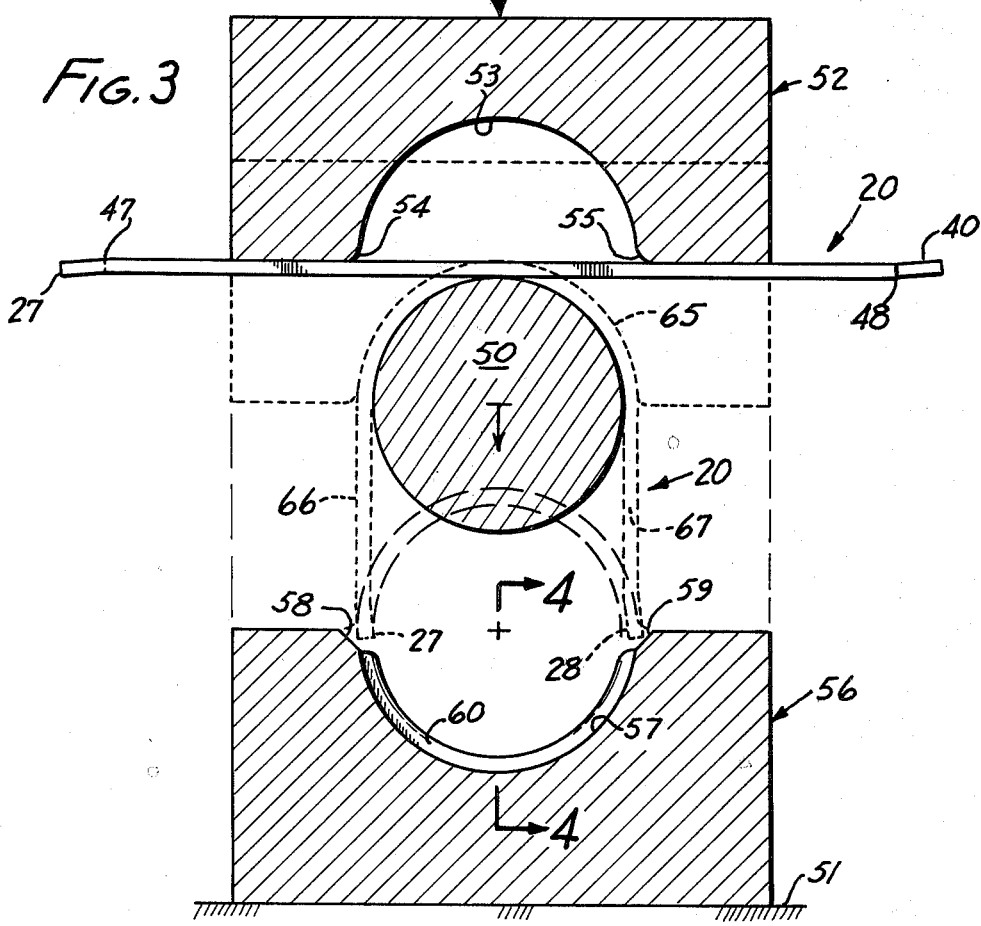
FIG. 3 is an end view of tooling for manufacturing the ring shown in two operating positions.
Figure 4:
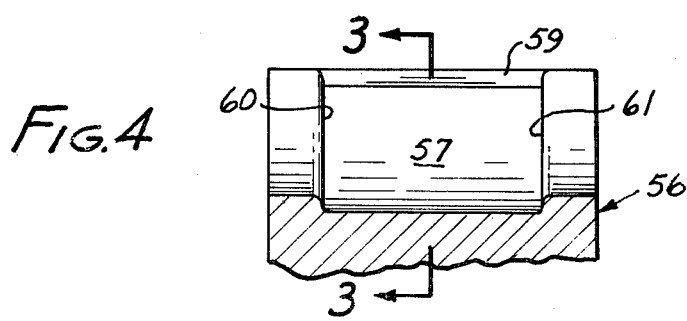
FIG. 4 is a cross-section taken at line 4—4 of FIG. 3.
Figure 9:
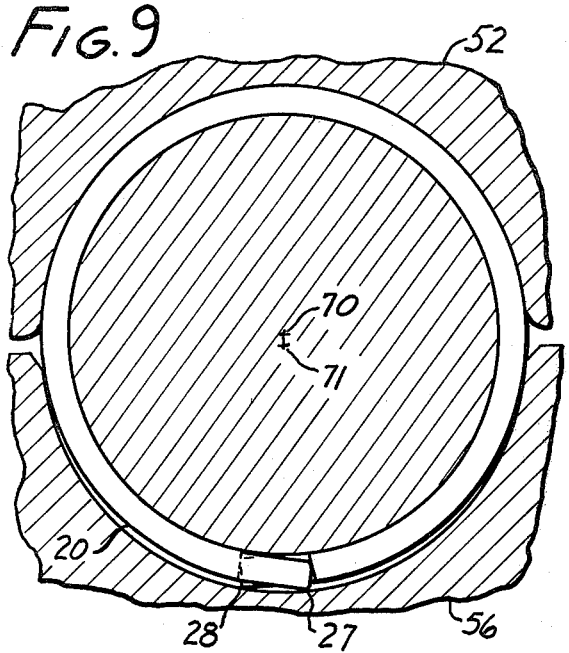
Figure 10:
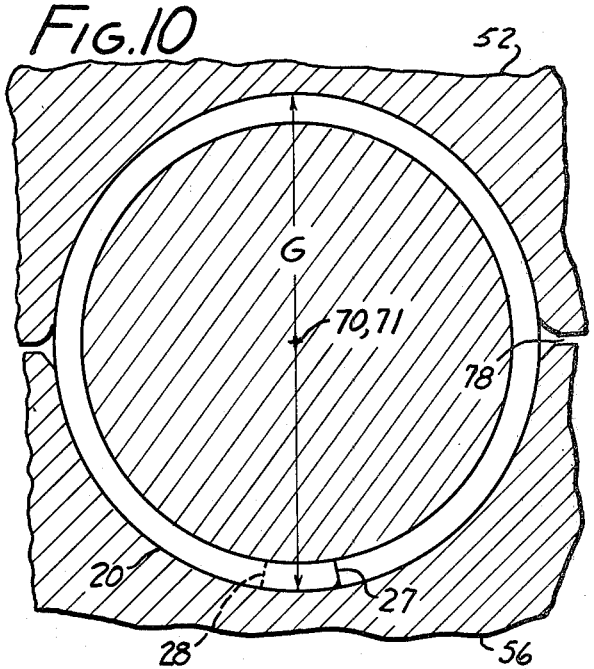
Figure 11:
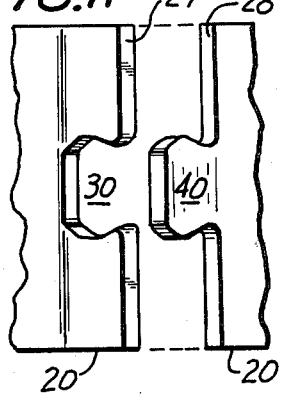
FIGS. 11-16 are progressive views showing the interlocking and coining of the tongue and the groove in positions respectively corresponding to FIGS. 5-10.
Figure 12:
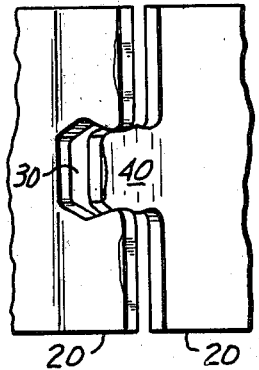
Figure 13:
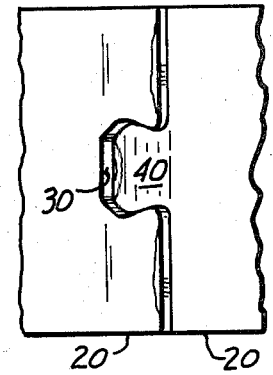
Figure 14:
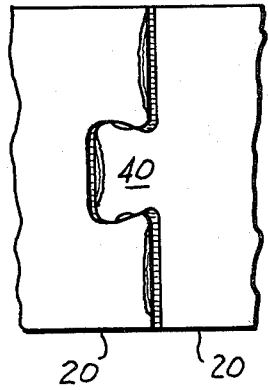
Figure 15:
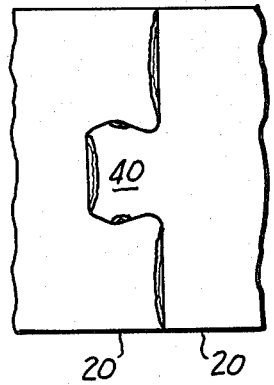
Figure 16:
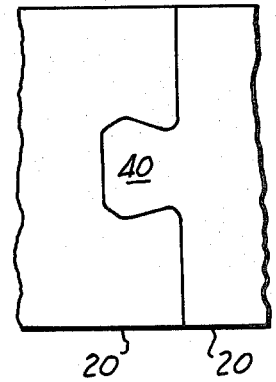

Initial cylinder forming is shown in FIG. 3 wherein the flat strip (except for the possible use of bends 47 and 48) is fed between the mandrel and the first die part, and then is bent down to form the said U-shape. At this time the sequence shown in FIGS. 5-10 begins. In these Figs., the centers 70, 71 of the mandrel and lower die part surface are shown. They will approach each other until when the ring is completed they substantially coincide.

In FIG. 5, the ends of the strip have moved down along the die face 59 until they begin to approach each other. It will be seen that the tendency of the strip is to wrap around the mandrel, the points of tangency 73, 74 having moved around the mandrel, but of course not yet all the way. Because of this there will be a slight bend at or near the points of tangency, with the free parts somewhat more planar than those which have already been bent. It will now be seen that the pilot section on the tongue spaces the locking segments upwardly and radially inwardly from the die surface, and farther than the tip edges 75 of the fingers. The bends 47 and 48 help assure that the tongue locking segments are boosted up, and the mating recess segments are lowered. This dimensional relationship will permit the interfering edges 76 at the intersections of the locking segments and pilot segments to pass with at least reduced dimensional interference. There usually will be some interference, and there will then be some displacement of metal, but it is surprising to see the degree of clearance and the relative freedom with which the interdigitation occurs as shown in FIG. 6. At about the position of FIG. 6, bend 48 begins to straighten out somewhat and the tongue begins to lay down closer to the plane of the fingers and of the recess. This movement which involves relatively small axial movements of the tongue and recess becomes more pronounced in FIGS. 7 and 8 as the structure begins to flatten out somewhat. By the time the arrangement of FIG. 9 has occurred, the ends are interlocking. There may be limited upset of galling on interlocking surfaces, but locking joint and cylinder construction are simultaneously completed by the coining operation which takes place at the condition of FIG. 10, which brings the die parts together against the ring and the ring against the mandrel. There will be slight clearances 78 between the die parts at the time of closure to protect the tooling.

The relative positions of the tongue and recess in FIGS. 5-10 are respectively shown in FIGS. 11 through 16. Any galling or upset in the interlocking joint is substantially ironed out in the coining operation of FIG. 10.

The tongues and the material adjacent to the recesses at the respective ends of the piece, are stiff enough that during the forming operation, contact with the die is only at the tip of the tongues and at the end edges adjacent to the recesses.

Bends 47 and 48 (angles A and B), while not essential, further raise the tongue's wide locking section (Dimension B) above the cylindrical forming surface, and also cause the interlocking tips of the recess or notch end to lie closer to the cylindrical forming surface, thus facilitating the non-destructive passage of the wide portion of the tongue by the narrow portion of the notch preparatory to locking engagement with the concurrent final cylindrical forming of the tongue and recess ends.

This system is particularly useful for making rings wherein the ratio of outer diameter to wall thickness is about 40:1 or less. It is desirable for the total lateral thickness of the fingers at the recess end, at their thinnest portion, to be somewhat less than maximum lateral width of the recess, because it is desirable for the tongue and for the fingers to have substantial strength to protect against separation by spring-back forces or subsequent loads on the ring. The width of the tongue or tongues and its base will not generally exceed about 60% of the lateral width of the strip.

The following is a set of dimensions suitable for use with this invention, relative to the drawings.

Material: Mild carbon steel
Width 21: 2¼
Thickness 22: 3/16
Length 23: 9½
Angle A: 5°
Angle B: 5°
Dimension C: 9/16
Dimension D: 1¼
Dimension E: 1-1/16
Dimension F: 5/16
Dimension G: ¼
Angle H: 15°
Dimensions are in inches, angles are in degrees.

More than one set of tongues and recesses can be provided, and in multiple or continuous sets of tongues and recesses where the two might otherwise be viewed interchangeably, it is a salient feature of this invention that the protruding fingers on one side (the "tongue"

side)—but not both sides—of the joint will have pronounced non-locking lead sections to carry the locking segment of the tongue above the mating recess's locking segment during cylindrical forming and interdigitation of the locking joint.

The invention provides both more accurate and stronger cylinders, and a more rapid and economical means for producing such cylinders.

This invention is not to be limited by the embodiments shown in the drawing and described in the description which are given by way of example and not of limitation, but only in accordance with the scope of the appended claims.

I claim:

1. A method for making an interdigitated stiff cylindrical ring starting with a flat piece of steel having a tongue projecting one end and a recess receding into the other end, said tongue and said recess being axially aligned with one another, each having a pair of locking segments at least one of which will interfere with the endwise separation of the ends of the ring, there being a maximum lateral spacing apart of said locking segments on the tongue and a minimum lateral spacing apart of said locking segments in the recess where said interference is maximum, the location of said maximum spacing apart of at least one of said tongue and recess being axially spaced from the respective end, said method comprising: using a first semi-cylindrical die with a concave half cylindrical die surface, bending said piece against and around a cylindrical mandrel to form a U-shaped structure with a bight and two parallel arms, and while holding the bight of said piece against the mandrel with the first said die, pressing the ends of said arms simultaneously against a unitary second concave half cylindrical surface on a second die along an axis which includes the centers of curvature of both half cylindrical surfaces and the center of the bight, thereby moving said ends of said arms along said second surface so as to approach and interdigitate one another in a motion which includes rotation, the stiffness of said tongue and of that part of the piece of steel at the end on which the recess opens, at least to said location of the maximum lateral spacing apart being such that it makes contact with said second surface during interdigitation, only at its axial termination, and then bringing the two dies against the ring and the ring against the mandrel to press the ring to a cylindrical shape, and removing the ring from the mandrel.

2. A method according to claim 1 in which the piece at the recess is initially bent so as to be toward the center of the ring.

3. A method according to claim 1 in which the tongue is initially bent so as to be away from the center of the ring.

4. A method according to claim 3 in which the piece at the recess is initially bent so as to be toward the center of the ring.

5. A method according to claim 4 in which the bends at the recess and in the tongue are made simultaneously with the cutting of the piece to shape.

6. A method according to claim 5 in which the piece of steel is cut from a continuous length of strip, identical cuts being made sequentially so as to form tongues and recesses which are complementary to one another.

7. A method according to claim 3 in which said tongue has a pair of pilot segments spacing said locking segments from the end of the tongue, and thereby from said second die surface during the interdigitation, said pilot segments diverging from one another as they extend away from the axial termination of the tongue.

8. A method according to claim 1 in which said tongue has a pair of pilot segments spacing said locking segments from the end of the tongue, and thereby from said second die surface during the interdigitation, said pilot segments diverging from one another as they extend away from the axial termination of the tongue.

9. A method according to claim 1 in which both of said lateral spacings apart are axially spaced from the respective axial termination of the tongue and from the end on which the recess opens.

10. A method according to claim 17 in which the axial distances of the spacings apart from the respective termination of the tongue are from the end on which the recess opens.

11. A method according to claim 1 in which the piece of steel is cut from a continuous length of strip, identical cuts being made sequentially so as to form tongues and recesses which are complementary to one another.

12. A method according to claim 1 in which a plurality pair of said tongues and recesses are provided and interdigitated.

13. A method according to claim 1 in which both of said locking segments interfere with said axial separation.

* * * * *